May 27, 1969  B. STAHLBERGER  3,446,634
SAUSAGE CASING HOLDER
Filed Sept. 22, 1966
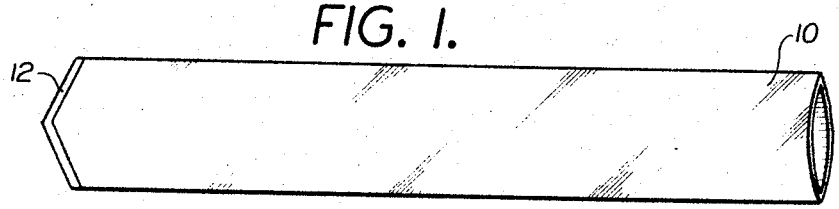
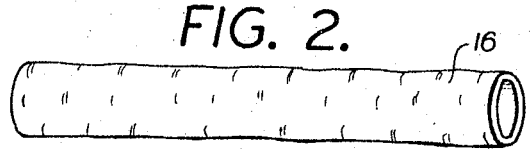
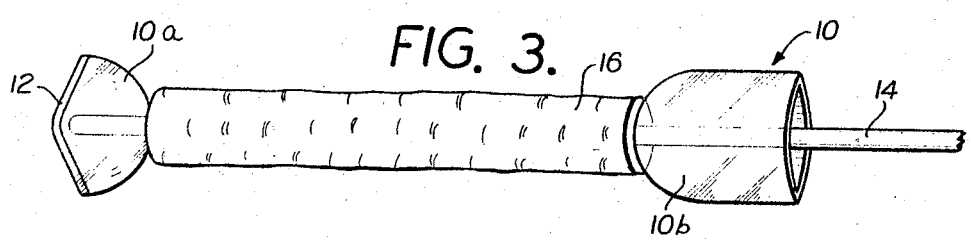
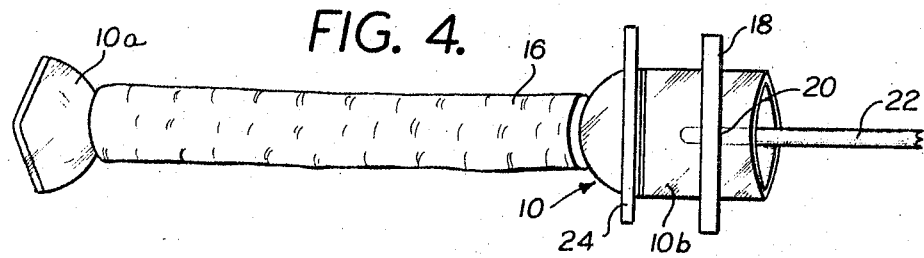
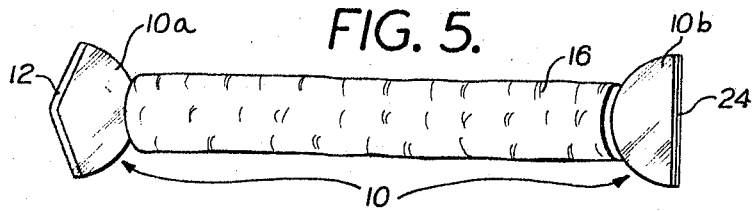
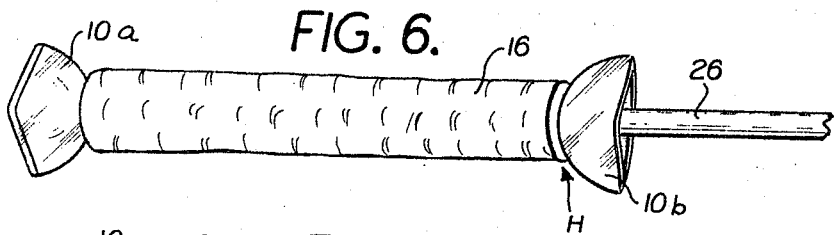
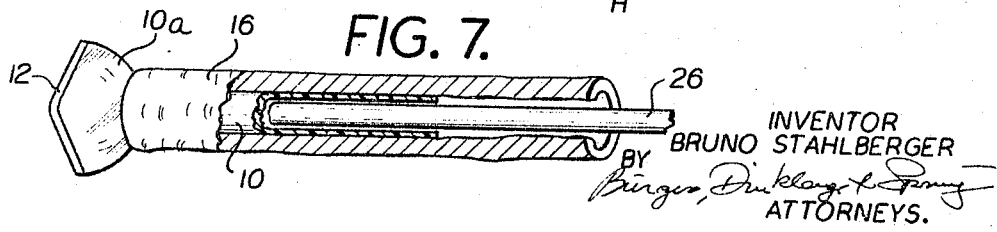
INVENTOR
BRUNO STAHLBERGER
BY
ATTORNEYS.

United States Patent Office 3,446,634
Patented May 27, 1969

3,446,634
SAUSAGE CASING HOLDER
Bruno Stahlberger, Buchs, St. Gall, Switzerland, assignor to Naturin-Werk Becker and Co., Weinheim, Bergstr., Germany, a corporation of Germany
Filed Sept. 22, 1966, Ser. No. 581,277
Claims priority, application Germany, Oct. 8, 1965, N 27,446
Int. Cl. A22c *13/00*
U.S. Cl. 99—176        10 Claims This invention relates to sausage casings. It more particularly refers to the field of edible sausage casings.

Shirred sausage casings have in the past consisted mainly of cellulose material. Since these casings were neither suitable nor intended for human consumption, it did not matter at all if they were made with a sufficient wall thickness to enable them to be used without previous soaking. The sausage casing served only as a temporary shell, and after the manufacture of the frankfurter, wiener, etc., it was removed by a relatively expensive peeling process.

For a number of years, edible artificial casings made of collagen material have been known, by which the peeling process is eliminated, since the casings have properties of edibility approaching those of natural intestine casings, to which the consumer is accustomed. These edible casings, of course, have not been made with sufficient wall thickness to withstand the stresses of sausgae stuffing without previous soaking. This does not apply to such types of sausage as, e.g., frying sausage, in which the casing can be filled very loosely with the meat without any subsequent disadvantages. Cooked sausages, however, must be stuffed tightly in order to prevent loose ends or other defects of shape. This means that the edible casings for cooked sausages must previously be soaked in water. On account of this necessity, manufactures of cooked sausages in edible casings have hitherto been unable to share in the advantages and savings which are offered by the use of small-sized synthetic sausage casings supplied in shirred form.

The basic material of all edible synthetic sausage casings is one that swells greatly upon the adsorption of water. Therefore, it is not surprising that dry shirred casings immediately swell when placed in water, become soft, and completely lose their shirring. The adsorption of water entails an elongation of the casing and an increase in circumference. This change in shape occurs in dry stuffing when the casings soften after filling due to adsorption of moisture from the forcement. This results in an insufficiently plump sausage.

Particularly when the sausage chains or pairs are hung from smoking skewers or the like, this disadvantage manifests itself in the forming of spindle-line or sharp-pointed sausage tips in the areas where the pairs of sausages straddle the smoking skewers. The sausage tips may assume a conchoidal shape here, too, resulting in a much greater area of contact with the smoking spits. These areas are not exposed to the smoke and exhibit an unpleasant pale color in the finished product.

There have been many proposals for eliminating these disadvantages by the use of reusable rods, tubes or supports. These were provided at one end with a fixed blocking means extending beyond the diameter of the shirred casing, while the other end was secured against the slipping off of the softened casing by a movable piece which had to be removed before the entire holder, or the pre-softened casing alone, was slipped onto the horn of the sausage stuffing machine.

The above-mentioned rods, tubes or supports had to have a stability sufficient to resist the swelling forces of the casing, which resulted in a material expense which was economically tolerable in only a very few cases. In addition, the reuse of the holders entailed additional costs in collecting, repacking and transporting them, sorting out defective holders, cleaning, etc., which neither the manufacturer nor the consumer liked. Only an inexpensive, "one-way" holder for the shirred sausage casing can be a satisfactory solution—one which the consumer can discard and which will not produce a bulky or voluminous trash pile.

It is therefore an object of this invention to provide a novel "one-way" holder for shirred sausage casings.

It is another object of this invention to provide a novel sausage casing-temporarly holder assembly.

It is a further object of this invention to provide an improved edible sausage casing.

Other and additional objects of this invention will become apparent from a consideration of this entire specification, including the drawing and claims appended hereto.

In accord with and fulfilling these objects, this invention provides, as one of its aspects, a shirred sausage casing having disposed therein a fluid inflated, flexible member substantially impervious to the inflating fluid of greater length than said shirred sausage casing, whereby portions of said member protrude from the ends of said shirred casing, wherein the inflated diameter of said protruding portions is greater than the diameter of said shirred sausage casing.

The requirements of a "one-way" holder are satisfied by the present invention in that an inflated holder made according to this invention supports a shirred casing on its axis and holds it by means of larger diameter protrusions at the extremities in such a manner as to prevent the casing from losing its form when softened in water due to water adsorption phenomena.

This invention will be best understood with reference to the accompanying drawing in which:

FIG. 1 is a perspective view of a blank from which the flexible member of this invention is made;

FIG. 2 is a perspective view of a shirred sausage casing for use in this invention;

FIGS. 3, 4 and 5 are successive perspective views showing the construction of the sausage casing-flexible holder assembly H of this invention; and FIGS. 6 and 7 are perspective views of the assembly H of this invention being mounted on a sausage stuffing device.

Referring now to these drawings, in which like parts have been given like numbers, a tube of flexible, and particularly FIGS. 1–5 thereof, potentially fluid-tight material 10 is provided having one end sealed 12. The sealed tube 10 is mounted on a guide rod 14 and inserted into the cavity of a shirred sausage casing 16 so that portions 10a and 10b of the tube extend beyond the ends of the sausage casing 16. The open end 10b of the tube 10 is hermetically sealed 18 with a suitable fluid injecting aperture 20 therein wherethrough a fluid injecting tube 22 is inserted and the tube 10 is inflated by injection of a suitable fluid. The open end 10b of the tube 10 is then sealed 24 in a fluid tight relation and the remainder of the open end 10b is suitably discarded. Thus, there has been produced an assembly of a sausage casing 16 having disposed therein an inflated tube 10 which tube has ends 10a protruding past the ends of the sausage casing, which protruding inflated ends have a larger diameter than the sausage casing.

Referring now to FIGS. 6 and 7, it is seen that the assembly H produced according to the process described with relation to FIGS. 1–5 is inserted over the horn 26 of a conventional sausage stuffing machine (not shown). The thrust of assembly H onto the horn 26 of the stuffing machine causes an increase in pressure in the flexible tube 10 causing it to burst, whereby entry of the horn 26 into the sausage casing cavity is facilitated. The entire sausage casing is fitted onto the horn 26 as is conventional practice, whereupon the tube 10 is pulled out of the sausage casing cavity and either discarded or re-used as appropriate. The sausage casing end is tied or otherwise closed as is conventional and stuffed in the usual manner.

Where the sausage casing is of the type that should advantageously be soaked prior to filling, it is convenient to immerse the entire assembly H into an appropriate soaking medium, suitably water, prior to mounting on the stuffing horn.

The composition of the supporting tube 10 is in no way critical to the practice of this invention. This composition should be as inexpensive as possible, however, for practical economic reasons. Further, the constitution of the tube should not be injurious to the sausage casing, nor should it present any purity problems with respect to the final sausage product, as for example by reason of undesirable plasticizer being leached out by the sausage casing or by the soaking procedure if one is used. It is within the scope of this invention to use substantially any flexible material which is substantially leak-proof with respect to the fluid medium used to fill it. Exemplary of such materials are film-forming polymers such as, for example, polyethylene, polypropylene, acrylic polymers, vinyl chloride polymers, copolymers of these materials with each other and with other monomers such as maleates, fumarates and itaconates, etc. For reasons of economy and ease of handling, polyethylene is preferred.

It is preferred to prepare the support tube with as small a wall thickness as possible consistent with the fluid-tight and support requirements thereof. Suitable wall thicknesses are from about 0.01 to 0.1 mm. It is convenient to specially design the support tube blank so as to be "dumbbell" shaped with a narrow center portion which is consistent with the inside diameter of the sausage casing to be supported. As will be apparent with this type of construction, upon inflation, the sausage casing will be retained between the large diameter ends of the "dumbbell." It will be appreciated that making tube blanks in this shape is wasteful of material and may be expensive as well as difficult.

It has been discovered, and this is another aspect of this invention, that a relatively uniform diameter support tube can be used in this invention. In this aspect of this invention, the uniform support tube diameter is greater than the inside diameter of the sausage casing which is to be supported. In the case where a soakable sausage casing is to be used, the support tube blank diameter should be larger than the diameter that the sausage casing will expand to upon soaking. Thus, upon insertion of this relatively uniform diameter support tube into the sausage casing and filling this tube with a support fluid as aforesaid, the protruding ends of the tube will fill with fluid to their full diameter and thus act as restraining stops to hold the sausage casing onto the support tube. The sausage casing will, however, restrain the portion of the support tube resident in the cavity thereof from expanding under fluid pressure to its full diameter and therefore the support tube wrinkles against the inside wall of the sausage casing. Surprisingly enough, this occurrence has been found to be unexpectedly advantageous since the wrinkles provide channels through which soaking fluid can obtain access to all surfaces of the sausage casing and swell the casing uniformly. In this embodiment of this invention care must be taken to limit the pressure under which the support tube is filled with support fluid to slightly in excess of atmospheric in order to prevent distention or rupture of the sausage casing by reason of this filling pressure.

As noted above, the support tube is filled with a fluid in order to impart to it a "dumbbell" shape. The composition of this fluid is not critical except in that the fluid and the tube compositions must be such that the tube will retain the fluid and, upon bursting of the tube, the fluid will in no way damage or detract from the sausage casing or the sausage being stuffed into the casing. For economic reasons both with respect to the cost of the fluid and with respect to the cost of transporting the supported casings, it is preferred to employ air in this use. Other fluids, such as water, nitrogen, carbon dioxide, etc. can be used with the same proficiency but with somewhat greater cost.

Sausage stuffing and the manufacture and composition of the sausage casing are completely conventional.

It may be desirable to provide an indication as to which end of the sausage casing is to be mounted on the stuffing horn. This can be provided by suitable markings on the support tube. One method which has been found to be convenient is to provide the support tube seals in the shape of arrow heads indicating the direction of travel of the sausage as it is being stuffed into the casing. These seals, in any desired form or shape, can be accomplished by welding or cementing as the case may be in accord with conventional good practice. The support tube may be seamed or seamless and may be provided with suitable dyes or pigments in order to color it. Conversely, the support tube may be colorless.

Through the present invention, it is possible to soak shirred, edible synthetic sausage casings without losing their shape, and to stuff them with the same speed as rodded dry casings. Nevertheless, the soaking process assures that the sausages will have the required diameter and the correct plumpness after the poaching process. The support tube in the form of the present invention can be used not only on small-gauge casings for frying sausages, but also with appropriate gauge, heavier wall thickness and higher internal pressure on other raw sausage, boiling sausage, large frying sausage and ring sausage castings.

This invention is illustrated by the following examples which are in no way limiting on the scope thereof.

EXAMPLE I (a) A frankfurter casing of edible collagen material, of a gauge size of 23 mm. and a length of about 8 meters is put up in shirred form, the shirred piece having a length of 17 cm., an inside diameter of 16 mm. and an outside diameter of 24 mm.

(b) A blue polyethylene tube with a gauge size of 32 mm., i.e., 50 mm. wide when flattened, and with a wall thickness of 0.05 mm., is welded closed at one end in the form of an obtuse V of about 120 degrees.

(c) The tube is then stretched out on a hollow mandrel of 40 cm. length and 7 mm. thickness (=diameter), and then introduced with the V-end foremost into the ruffled casing in the stuffing direction, until it protrudes 2.5 cm. beyond the other end of the casing.

(d) The mandrel is now withdrawn until only 20 mm. of tube is still on it. This extremity is placed into the pressing device 18 (FIG. 4) and the device is closed up airtight. Compressed air is then fed through the mandrel until an overpressure of 0.2 atmosphere is achieved.

(e) In front of the pressing device 18 (FIG. 4), at a distance of 10 mm. in the direction of the casing, a hermetically sealing device 24 (FIG. 4) is closed, so that two separate air pillows develop. The holder 18 over the mandrel is then opened, so that the tube is relieved of pressure on this end of the tube and can be thermoplastically welded shut close to device 24. Device 24 at the same time protects the air pillow at the end of the casing against the welding heat.

(f) The holder and its casing are now ready for packing.

EXAMPLE II (a) A shirred ring-sausage casing of 38 mm. size, which has been twisted once about its axis per meter in the shirring process, so that the shirring density over the entire casing is uniform, has a shirred length of 25 cm., an inside diameter of 26 mm. and an outside diameter of 40 mm.

(b) A blue polyethylene tube 37 cm. long, of 53 mm. gauge size (i.e., 88 mm. wide in flattened form), with a wall thickness of 0.08 mm., is welded shut at one end in the form of an obtuse V of about 120 degrees.

(c) The tube is then placed over a hollow mandrel 50 cm. long and 7 mm. in diameter, and then, with the V-shaped end foremost, is introduced into the shirred casing until it extends 3 cm. beyond the other end of the casing.

(d) The mandrel is then withdrawn until only 20 mm. of tube are left on it. This extremity is placed into the pressing device 18 (FIG. 4), and the device is closed airtight. Compressed air is then fed through the mandrel until an overpressure of 0.35 atmosphere has been achieved.

(e) In front of the pressing device 18 (FIG. 4), at a distance of 10 mm. in the direction of the casing, a hermetically sealing device 24 (FIG. 4) is closed, so that two separate air pillows develop. The holder 18 over the mandrel is then opened, so that the tube is relieved of pressure on this end of the tube and can be thermoplastically welded shut close to device 24. Device 24 at the same time protects the air pillow at the end of the casing against the welding heat.

(f) The holder and its casing are then ready for packing or use.

What is claimed is:

1. A shirred sausage casing having disposed therein a fluid inflated flexible supporting member of greater length than said sausage casing and having portions of said member protruding beyond the ends of said casing where the diameter of said protrusions is greater than the diameter of said sausage casing.

2. A sausage casing as claimed in claim 1, wherein said supporting member is about 0.01 to 0.1 mm. in wall thickness and is comprised of a polymer selected from the group consisting of polyethylene, polypropylene, acrylic polymers, vinyl chloride polymers and copolymers thereof.

3. A sausage casing as claimed in claim 1, wherein said casing is proteinaceous and adapted to be soaked prior to filling.

4. A sausage casing as claimed in claim 1, wherein said supporting member has a substantially uniform diameter prior to disposition in said casing.

5. A sausage casing as claimed in claim 4, wherein said inflated supporting member has wrinkles in the surface thereof juxtaposed said sausage casing.

6. A sausage casing as claimed in claim 1, wherein said support member has a color imparted thereto.

7. A sausage casing as claimed in claim 1, wherein said inflating fluid is air.

8. The method of producing a sausage, which comprises inserting a tubular supporting film into the cavity of a shirred sausage casing having a diameter smaller than the unrestrained diameter of said supporting film, such that a portion of said supporting film protrudes beyond both ends of said shirred sausage casings; sealing one end of said supporting film; inflating said supporting film; sealing the unsealed end of said inflating film; soaking the casing-film assembly in water; inserting one end of said sausage casing over the horn of a sausage stuffing device, whereby said inflating film is ruptured; removing said ruptured film from said assembly; and stuffing said sausage casing.

9. The method as claimed in claim 8, wherein said inflating fluid is air and said supporting film is polyethylene.

10. The method as claimed in claim 8, wherein said supporting tube is inflated at slightly above atmospheric pressure.

References Cited

FOREIGN PATENTS 537,706  3/1957  Canada.

A. LOUIS MONACELL, *Primary Examiner.*

W. C. LAWTON, *Assistant Examiner.*

U.S. Cl. X.R.

206—46